Aug. 21, 1934. C. E. DIRKES 1,971,097
METERING CONTROL MECHANISM
Filed May 16, 1931
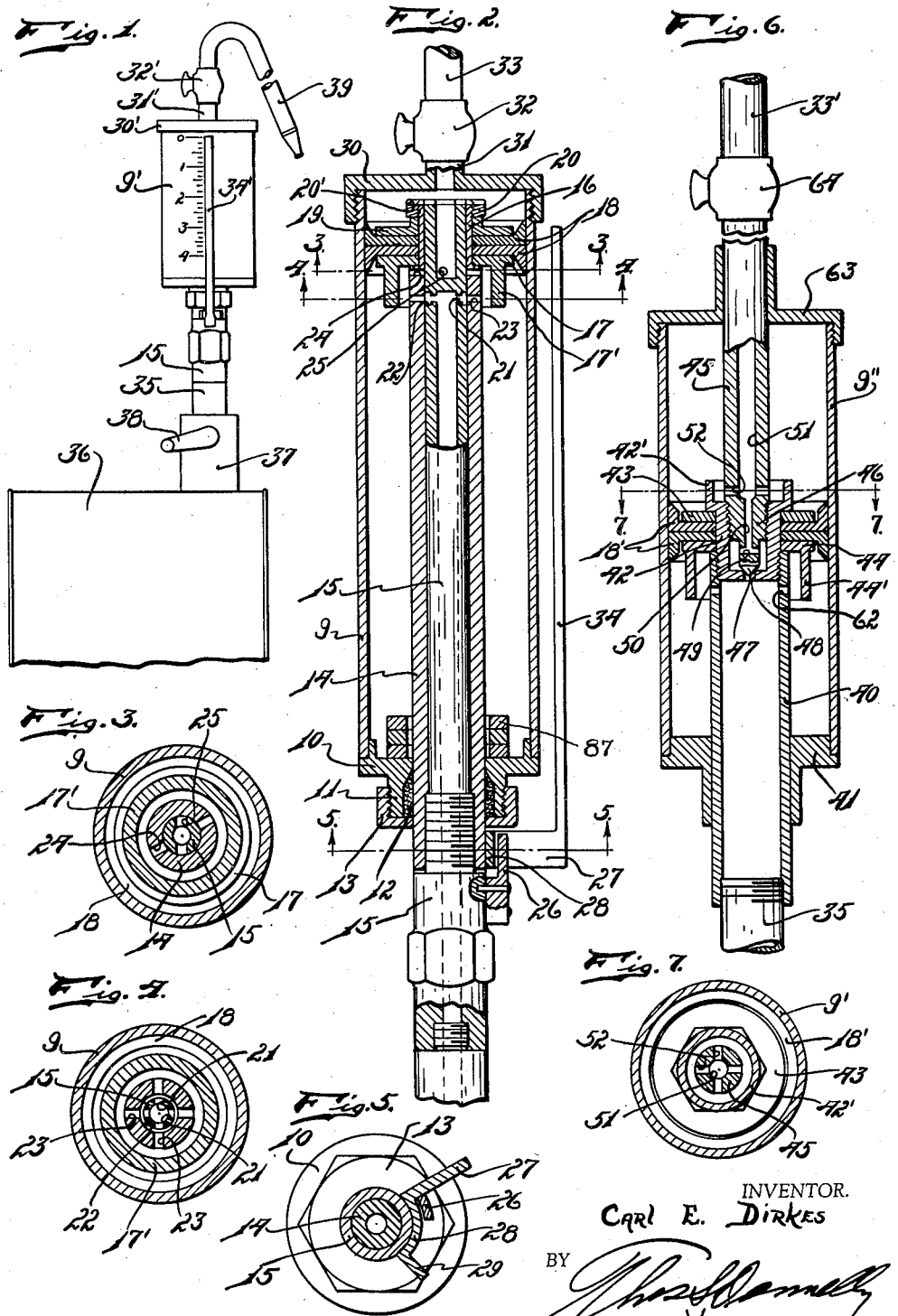
INVENTOR.
CARL E. DIRKES
BY
ATTORNEY Patented Aug. 21, 1934

1,971,097

UNITED STATES PATENT OFFICE 1,971,097

METERING CONTROL MECHANISM

Carl E. Dirkes, Detroit, Mich.

Application May 16, 1931, Serial No. 537,977

6 Claims. (Cl. 221—103)

My invention relates to a new and useful improvement in a metering control mechanism adapted for delivering under pressure through a suitable delivery conduit or pipe, a predetermined quantity of flowable material such as grease, oil, gasoline, water or the like. The invention is particularly adapted for lubricating purposes and it is an object of the present invention to provide a device of this class which will be simple in structure, economical of manufacture, durable, highly efficient in use, possessed of a minimum number of parts, and easily and quickly assembled.

It is another object of the present invention to provide a device which may be used for transmitting a predetermined amount of material through the outlet delivery conduit under pressure or which may be used for delivering direct from the source of supply, the material.

Another object of the invention is the provision of a metering device of this class in which a single system of piping may be used for transmitting the material to be delivered to the metering or measuring cup.

Other objects will appear hereinafter.

The invention consists in the combination and arrangement of parts hereinafter described and claimed.

The invention will be best understood by a reference to the accompanying drawing which forms a part of this specification, and in which, Fig. 1 is a side elevational view of the invention showing it applied.

Fig. 2 is a central longitudinal view of the invention.

Fig. 3 is a sectional view taken on line 3—3 of Fig. 2.

Fig. 4 is a transverse sectional view taken on line 4—4 of Fig. 2.

Fig. 5 is a sectional view taken on line 5—5 of Fig. 2.

Fig. 6 is a longitudinal central sectional view of a modified form of the invention.

Fig. 7 is a sectional view taken on line 7—7 of Fig. 6.

In the invention I use a metering or measuring container or cylinder 9 which is provided at one end with a cap 10, having a stuffing box 11 for the reception of packing 12 which is compressed by the jam nut 13. Extending longitudinally of the container or cylinder 9 and projecting inwardly thereof and extending through the cap 10 is a tube 14 which embraces and is threaded at its outer end onto the tube 15. The tube 14 is reduced in outside diameter as at 16 and on this reduced portion is a plate 17 projecting from one face of which is the cylindrical flange 17', the other face engaging the yieldable washer 18 so as to compress the same against the non-flexible disc 19 which is held in position by the nut 20 in the outer face of which is formed the groove 20'. Radial openings 21 are formed in the tube 15 to communicate with a peripheral groove 22 which is in registration with openings 23 formed in the tube 14. Radial openings 24 are formed in the tube 14 and are adapted at times to register with the openings 25 formed in the tube 15. Fixedly mounted on the outer end of the tube 15 is a stop 26 which is adapted to engage the outwardly turned arms 27 and 29 which project outwardly from the curved bar 28 which is fixedly mounted on the periphery of the outer end of the tube 14. A cap 30 is threaded onto the opposite end of the cylinder or container 9 and provided with a neck 31 on which is mounted a valve 32 to control communication of the cylinder or container 9 with the outlet delivery pipe 33.

Projecting upwardly from the member 27 is a gauge bar 34 which may be provided with graduations whereby the amount of material in the container 9 may be gauged.

In Fig. 1 I have shown the graduations on the container 9' itself, which will co-operate with the end of the bar 34' or any mark which may be placed on the bar 34', this bar 34' corresponding to the bar 34 illustrated in Fig. 2. An inlet delivery pipe 35 is connected to the outer end of the tube 15.

By means of the member 27, the tube 14 may be rotated relatively to the tube 15. When these tubes are so rotated that the openings 24 and 25 are in registration, the material forced through the tube 15 from the source of supply will pass outwardly through the openings 21 and 23 into the interior of the container or cylinder 9 until the same has been filled, upon which, further delivery of the material will force the material through the openings 24 and 25 into the container or cylinder 9 at the opposite side of the piston. As the delivery continues, owing to the different amounts of exposed area at opposite sides of the piston, the piston will be forced downwardly from the position shown in Fig. 2 to the bottom of the cylinder or container, thus displacing or transferring the material in the cylinder or container to the opposite side of the piston and depositing about the piston in the cylinder or container 9 a predetermined amount of material. In this operation, it is of course assumed that the valve 32 is closed. When it is desired to deliver the contents of the cylinder or container 9, which is of course a predetermined amount, the valve 32 is opened and the tubes 14 and 15 rotated until the openings 24 and 25 do not register. In such an instance, delivery of material through the inlet delivery pipe 35 will cause the piston to move upwardly relatively to the cylinder or container 9, thus forcing the material in front of the piston outwardly through the outlet delivery pipe 33 and filling the container or cylinder behind the piston. The groove 20' is formed so that in the reverse operation, when the movement is initially started, a passage for the escape of the material from the tube 15 into the container or cylinder 9 will be provided. After the delivery of the predetermined amount, upon a closing of the valve 32, and the further delivery of material through the pipe 35, the reverse travelling of the piston will again be effected to again "load" the cylinder for another operation, as stated above.

It is believed obvious that the device may be used for direct lubrication or direct delivery from the source of supply through the pipe 35 and through the pipe 33 by maintaining the valve 32 open while the openings 24 and 25 are in registration.

Since the position of the piston relatively to the tubes 14 and 15 is fixed, it is evident that a mounting in which the cylinder is floating or in which these tubes are floating is necessary.

In the form shown in Fig. 1, I have illustrated the invention used with an oil delivery pump 37 which is operated by the crank 38 to deliver oil from the container 36. The delivery pipe 35 is connected to the tube 15 in the manner indicated in Fig. 2, and the valve 32' is used for the purposes described relatively to the valve 32. A flexible outlet delivery tube 39 corresponds to the tube 33.

In the modified form, I have shown a form which in structural detail differs somewhat from the structure shown in Fig. 2, but which in operation is quite similar and substantially the same. The tubes 14 and 15 with the openings 24 and 25 formed therein may be said to constitute a valve arrangement and in the modified form the valve arrangement differs in that it is of the needle type.

In the modified form, I provide a metering or measuring container or cylinder 9'' into which is projected slidably through the cap 41, the tube 40, which is connected to the inlet delivery pipe 35. Threaded into the end of the pipe 40 beyond the openings 62 formed in the pipe 40 is a cup shaped fitting 42 which serves to effect a clamping of the washers 18' between the rigid discs or washers 43 and 44. A circular flange 44' projects outwardly from one face of the disc 44 and a circular flange 42' projects outwardly from one end of the fitting 42. A pipe 45 is projected slidably through the cap 63, and this pipe 45 is provided with the reduced threaded portion 46 which threads into the fitting 42. Projecting from the reduced threaded portion 46 is a needle valve forming portion 47 having a radial passage 49 provided therein communicating with the axial passage 50 in the reduced portion 46 which communicates with the passage or bore 51 in the tube 45. The needle valve is tapered to serve as a closure for the opening 48 which is formed centrally in the cup shaped fitting 42. A valve 64 is mounted on the outer end of the tube 45 to control communication of the tube 45 with the outlet delivery pipe 33'. Radial openings or passages 52 communicate with the passage 51.

In operation, when the tube or pipe 45 is rotated to bring the needle valve 47 into closing position relatively to the opening 48 and material under pressure is delivered to the pipe 35, this material will flow outwardly through the opening 62 and fill the cylinder or container 9'' and force a movement of the piston relatively thereto until it arrives at the upper end of the cylinder. This will, when the valve 64 is open, force outwardly through the delivery pipe 33' the material which was within the cylinder 9'' above the piston, thus effecting a delivery of a predetermined amount of material under pressure. To effect a movement of the piston to the other end of the cylinder and again "load" the cylinder for another operation, it is but necessary to close the valve 64, rotate the pipe 45 relatively to the fitting 42 until the needle valve is moved to open position, upon which the material delivered through the pipe 35 will flow through the opening 48, through the passages 49 and 50 and outwardly through the openings 52. On account of the larger exposed area of the piston on one side than the other, this will cause the piston to move downwardly relatively to the cylinder 9'' and thus move the parts to position for another operation involving the delivery of a predetermined amount of material through the outlet delivery pipe 33'.

It is obvious that the device may be used for direct delivery from the pipe 35 to the pipe 33' by maintaining the needle valve in open position while the valve 64 is open. Since the piston is fixed relatively to the pipes or tubes 40 and 45, it is obvious either that these pipes must be of a floating nature or that the cylinder or container 9'' is mounted in a floating condition.

By positioning a number of loose washers or spacers 87 in the cylinder or container 9, or 9'', the capacity of the cylinder may be varied depending upon the number of washers or spacers which are used.

While I have illustrated and described the preferred form of construction of my invention, I do not wish to limit myself to the precise details of structure shown, but desire to avail myself of such variations and modifications as may come within the scope of the appended claims.

Having thus described my invention, what I claim as new and desire to secure by Letters Patent is:

1. In a device of the class described, a cylinder forming container; a piston slidably mounted in said container; an inlet delivery conduit permanently in communication with said container at one side of said piston, and adapted for communicating with said container at the opposite side of said piston through a passage extending through said piston, said piston being axially fixed relatively to said conduit; and a valve mechanism for controlling communication of said inlet delivery conduit with said container at the opposite side of said piston said valve mechanism being movable axially of said container in unison with said piston.

2. In a device of the class described, a cylinder forming container; a piston slidably mounted in said container; and inlet conduit permanently in communication with said container at one side of said piston, and adapted for communicating with said container at the opposite side of said piston through a passage extending through said piston, said piston being axially fixed relatively to said conduit; and means operable at will for opening and closing communication of said conduit with said passage said valve mechanism being movable axially of said container in unison with said piston.

3. A device of the class described comprising a cylinder; an inlet conduit extending into said cylinder at one end thereof; a piston carried on the inner end of said conduit, said piston being fixed axially relatively to said conduit, said conduit and said piston being axially movable relatively to said cylinder; and a valve mechanism carried by said piston and movable in unison therewith for controlling communication of said conduit with said cylinder at one side of said piston.

4. A device of the class described comprising a cylinder; an inlet conduit extending into said cylinder at one end thereof; a piston carried on the inner end of said conduit, said piston being fixed axially relatively to said conduit, said conduit and said piston being axially movable relatively to said cylinder; a valve mechanism carried by said piston and movable in unison therewith for controlling communication of said conduit with said cylinder at one side of said piston; and an outlet conduit communicating with said cylinder at the opposite end thereof.

5. A device of the class described comprising a cylinder; an inlet conduit extending into said cylinder at one end thereof; a piston carried on the inner end of said conduit, said piston being fixed axially relatively to said conduit, said conduit and said piston being axially movable relatively to said cylinder; a valve mechanism carried by said piston and movable in unison therewith for controlling communication of said conduit with said cylinder at one side of said piston; and rotatable means for operating said valve mechanism.

6. In a device of the class described, a cylinder; a piston slidably mounted in said cylinder; an inlet conduit extending into said cylinder, and permanently in communication with the interior thereof, at one side of said piston; and a rotatably operated control mechanism for, upon rotation, controlling the communication of said conduit with said cylinder at the opposite side of said piston, said control mechanism being movable axially of said cylinder in unison with said piston.

CARL E. DIRKES.